US011254368B2

(12) United States Patent
Park

(10) Patent No.: US 11,254,368 B2
(45) Date of Patent: Feb. 22, 2022

(54) STRUCTURE FOR REINFORCING AND SUPPORTING VEHICLE FRUNK

(71) Applicants: Hyundai Motor Company, Seoul (KR); Kia Motors Corporation, Seoul (KR)

(72) Inventor: Ji Woong Park, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 17/008,195

(22) Filed: Aug. 31, 2020

(65) Prior Publication Data

US 2021/0179185 A1 Jun. 17, 2021

(30) Foreign Application Priority Data

Dec. 16, 2019 (KR) .................. 10-2019-0168061

(51) Int. Cl.
| | | |
|---|---|---|
| *B62D 25/00* | (2006.01) | |
| *B62D 25/08* | (2006.01) | |
| *B62D 21/11* | (2006.01) | |
| *B62D 21/03* | (2006.01) | |
| *B60K 6/26* | (2007.10) | |
| *B60K 1/00* | (2006.01) | |

(52) U.S. Cl.
CPC .......... *B62D 25/087* (2013.01); *B62D 21/03* (2013.01); *B62D 21/11* (2013.01); *B60K 1/00* (2013.01); *B60K 6/26* (2013.01); *B60Y 2200/91* (2013.01); *B60Y 2200/92* (2013.01)

(58) Field of Classification Search
CPC ...... B62D 25/087; B62D 21/03; B62D 21/11; B60K 1/00; B60K 6/26; B60Y 2200/91; B60Y 2200/92
See application file for complete search history.

(56) References Cited

U.S. PATENT DOCUMENTS

| | | | | |
|---|---|---|---|---|
| 10,202,069 | B2 * | 2/2019 | Salter | B60Q 3/80 |
| 2019/0210422 | A1 * | 7/2019 | Eckert | B60K 1/04 |

FOREIGN PATENT DOCUMENTS

| | | | | |
|---|---|---|---|---|
| EP | 3569449 | A1 * | 11/2019 | B32B 5/026 |
| KR | 101673340 | B1 | 11/2016 | |

* cited by examiner

*Primary Examiner* — Lori L Lyjak
(74) *Attorney, Agent, or Firm* — Mintz Levin Cohn Ferris Glovsky & Popeo, P.C.; Peter F. Coriess

(57) ABSTRACT

A structure for reinforcing and supporting a vehicle frunk includes front side members installed in a front-to-back direction of a vehicle body at both sides of a front floor panel of a vehicle, a frunk bar extending in a width direction of the vehicle between the front side members and connected to the front side members, a bracket formed at a position corresponding to connection between the frunk bar and a respective one of the front side members, to couple the frunk bar to the respective one of the front side members, at least two motor mounts formed beneath the frunk bar in a height direction of the frunk bar, and a subframe positioned beneath the motor mounts in a height direction of the motor mounts and connected to the front side members to extend in the width direction of the vehicle.

6 Claims, 4 Drawing Sheets

STRUCTURE FOR REINFORCING AND SUPPORTING VEHICLE FRUNK

CROSS-REFERENCE TO RELATED APPLICATION

This application claims under 35 U.S.C. § 119(a) the benefit of Korean Patent Application No. 10-2019-0168061 filed on Dec. 16, 2019, the entire contents of which are incorporated herein by reference.

BACKGROUND

(a) Technical Field

The present disclosure relates to a structure for reinforcing and supporting a vehicle frunk, more particularly, to the structure that improves a position between support members in a vehicle frunk space and enhances support rigidity of the support members in the frunk space by improving a bolting direction between the support members.

(b) Description of the Related Art

In general, a front body of a vehicle is a frame that is positioned in a front of the vehicle in a longitudinal direction so as to define an engine compartment. The front body includes a front end module that defines a front of the engine compartment and is equipped with a cooling module, a head lamp, front fender apron members that define the left and right sides of the engine compartment and each have a space in which a suspension is mounted and a wheel is installed, a dash panel that is positioned at the rear of the engine compartment and partitions the engine compartment from a passenger compartment, and so on.

In addition, front side members extend in the longitudinal direction of the vehicle on both sides of a lower portion of the engine compartment to reinforce structural rigidity of the front body, and a subframe is coupled to each of the front side members at a lower portion of the front side members to support a suspension and the like as well as an engine and a transmission installed in the engine compartment.

In an electric vehicle equipped with a motor, the volume of an engine compartment is reduced because there is no engine, and a remaining space of the engine compartment is used as a cargo space referred to as a frunk.

In such a frunk structure, there may be instances in which not only cargo but also people are seated due to misuse. Therefore, there is a need for a frunk support structure that may withstand a load above a certain level.

In a conventional frunk structure, both ends of a transverse member that reinforces a frunk are simply coupled to side members of a vehicle. In such an arrangement, an amount of elastic deformation of the transverse member may increase as a distance from a fixed end of the transverse member increases.

In addition, since the transverse member for reinforcing the frunk is connected in a simple thin bracket mounting manner that may deteriorate its resistance to rotational distortion, the transverse member may not serve as a load path in the event of a vehicle collision.

The above information disclosed in this Background section is only for enhancement of understanding of the background of the disclosure and therefore it may contain information that does not form the prior art that is already known in this country to a person of ordinary skill in the art.

SUMMARY

In one aspect, the present disclosure provides a structure for reinforcing and supporting a vehicle frunk, which includes a frunk bar, motor mounts, and a subframe preferably arranged on a same line in a height direction of a vehicle.

In another aspect, the present disclosure provides a structure for reinforcing and supporting a vehicle frunk, which couples and fixes a frunk bar to front side members by a bolting structure that passes through the front side members in a longitudinal direction of a vehicle.

In a further aspect, the present disclosure provides a structure for reinforcing and supporting a vehicle frunk, which includes a bracket configured to connect a frunk bar to each front side member and to have a truss shape in cross-section.

The present disclosure is not limited to the above-mentioned aspects, and other aspects and advantages of the present disclosure can be understood by the following description and become apparent with reference to the embodiments of the present disclosure. Also, it is obvious to those skilled in the art to which the present disclosure pertains that the aspects and advantages of the present disclosure can be realized by the means as claimed and combinations thereof.

The above and other aspects can be accomplished by the provision of a structure for reinforcing and supporting a vehicle frunk.

In a preferred embodiment, there is provided a structure for reinforcing and supporting a vehicle frunk, which includes front side members installed in a front-to-back direction of a vehicle body at both sides of a front floor panel of a vehicle, a frunk bar extending in a width direction of the vehicle between the front side members and connected to the front side members, a bracket formed at a position corresponding to connection between the frunk bar and a respective one of the front side members, to couple the frunk bar to the respective one of the front side members, at least two motor mounts formed beneath the frunk bar in a height direction of the frunk bar, and a subframe positioned beneath the motor mounts in a height direction of the motor mounts and connected to the front side members to extend in the width direction of the vehicle.

The bracket may have a truss shape in cross-section.

The frunk bar may be coupled to each of the front side members by the bracket having a bolting structure that passes through the respective one of the front side members in a longitudinal direction of the vehicle.

The motor mounts may be configured to resist a load applied to the frunk bar in a height direction of the vehicle.

The structure may further include at least one frunk bar through-pipe formed through the frunk bar in the height direction of the frunk bar at a position corresponding to each of the motor mounts.

The frunk bar, the motor mounts, and the subframe may be positioned in a straight line in the height direction of the vehicle.

Other aspects and preferred embodiments of the disclosure are discussed infra.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure, and wherein.

Figure 1:
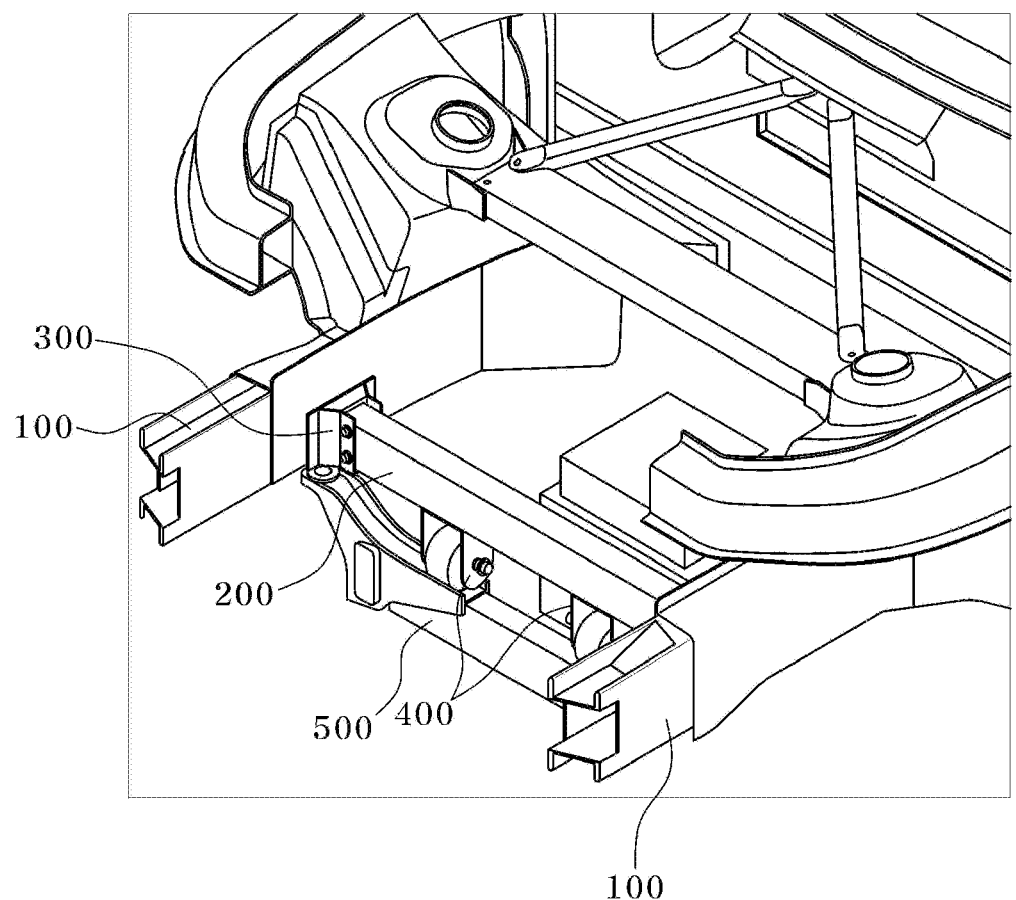
FIG. 1 is a perspective view illustrating a structure for reinforcing and supporting a vehicle frunk according to an embodiment of the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter reference will now be made in detail to various embodiments of the present disclosure, examples of which are illustrated in the accompanying drawings and described below. While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

In addition, the term "part" or the like used herein refer to a unit for processing at least one function or operation, which may be implemented by hardware or software, or in combination thereof.

In addition, the terms "height direction", "width direction", and/or "longitudinal direction" used herein refers to directions indicated based on a vehicle.

In addition, it will be understood that when an element is referred to as being "above" or "on" another element, it can be "immediately above" the other element or intervening elements may also be present. In contrast, it will be understood that when an element is referred to as being "beneath" or "under" another element, it can be "immediately beneath" the other element or intervening elements may also be present.

In addition, an electric vehicle as described herein refers to all vehicles using electricity as power, and may include a hybrid electric vehicle (HEV) and a plug-in hybrid electric vehicle (PHEV) using electricity as part of power.

FIG. 1 is a perspective view illustrating a structure for reinforcing and supporting a vehicle frunk according to an embodiment of the present disclosure.

Referring to FIG. 1, the structure for reinforcing and supporting a vehicle frunk according to the embodiment of the present disclosure may include front side members 100 that are installed in a front-to-back direction of a vehicle body at both sides of a front floor panel of a vehicle, a frunk bar 200 that extends in a width direction of the vehicle between the front side members 100 and are connected to the front side members 100, a bracket 300 that connect the frunk bar 200 to a respective one of the front side members 100, at least two motor mounts 400 that are formed beneath the frunk bar 200 in a height direction of the frunk bar 200, and a subframe 500 that is positioned beneath the motor mounts 400 in a height direction of the motor mounts 400 and connected to the front side members 100 to extend in the width direction of the vehicle.

In addition, the frunk bar 200, the motor mounts 400, and the subframe 500 may be positioned in a straight line in the height direction of the vehicle. In particular, the frunk bar 200, the motor mounts 400, and the subframe 500 may be aligned in the height direction, and may have corresponding widths (e.g., the motor mounts 400 and the subframe 500 preferably do not exceed the width of the frunk bar 200).

The front side members 100 may be installed in the front-to-back direction of the vehicle body at both sides of the front floor panel of the vehicle. Preferably, a pair of front side members 100 may be provided at the respective sides of the front floor panel. The front side members 100 may be made of high-strength steel to stably resist an impact so as to secure a frunk space and prevent damage to components. Each of the front side members 100 may have a closed cross-sectional "□" shape in the width direction of the vehicle.

The frunk bar 200 may extend in the width direction of the vehicle between the front side members 100 and be connected to the front side members 100. The frunk bar 200 may serve as a support for reinforcing rigidity in the frunk space. The frunk bar 200 may absorb the impact applied from the front of the vehicle in the event of vehicle collision. The frunk bar 200 may made of a high-strength steel material.

The bracket 300 may be formed at a position corresponding to the connection between the frunk bar 200 and a respective one of the front side members 100. In particular, two brackets 300 may be provided to connect with each of the front side members 100, respectively. Preferably, the brackets 300 may be connected to the respective ends of the frunk bar 200 so that the frunk bar 200 is connected to the front side members 100. Each of the brackets 300 may be resistant to rotational distortion.

When a load is applied to the frunk space, the bracket 300 may generate a reaction force upward in the height direction at each end of the frunk bar 200 to resist the load.

The at least two motor mounts 400 may be formed beneath the frunk bar 200 in the height direction frunk bar 200. Preferably, the two motor mounts 400 may be in contact with the bottom of the frunk bar 200 and spaced apart at predetermined intervals from the widthwise center of the frunk bar 200.

When a load is applied to the frunk space, each of the motor mounts 400 may generate a reaction force upward in the height direction from the widthwise center of the frunk bar 200 to resist the load together with the bracket 300.

Thus, since the motor mount 400 generates the additional reaction force at the center of the frunk space, it is possible to prevent the center of the frunk bar 200 from sagging.

The motor mount 400 may be configured to surround a motor with an insulated rubber bush to prevent transmission of rotational vibration to the vehicle body. Preferably, the motor mount 400 may have a rectangular cross-sectional shape that is open at the lower portion of the motor mount 400 in the longitudinal direction of the vehicle.

The lower portion of the motor mount 400 may be connected to the subframe 500 and one end of the rubber bush may be bonded to the subframe 500.

The subframe 500 may be positioned beneath the motor mount 400 in the height direction of the motor mount 400 and connected to the front side members 100 to extend in the width direction of the vehicle. The subframe 500 may be installed on the front bottoms of the front side members 100 to support the components and suspensions of the power transmission system.

Both front and rear sides of the subframe 500 may be fastened to the front side members 100 through mounting units. The subframe 500 may be designed to ensure safety in the event of forward collision.

In the structure for reinforcing and supporting a vehicle frunk according to the embodiment of the present disclosure, the frunk bar 200, the motor mounts 400, and the subframe 500 may be positioned in a straight line in the height direction of the vehicle. For example, the motor mounts 400 and the subframe 500 may have widths that correspond to, but preferably do not exceed, a width of the frunk bar 200.

Preferably, the lower portion of the frunk bar 200 is in contact with the upper portions of the two motor mounts 400, which may prevent the center of the frunk bar 200 from being deformed. In addition, the lower portions of the motor mounts 400 are in contact with the upper portion of the subframe 500, which may improve the support rigidity of the frunk bar 200 in the height direction of the frunk bar 200.

Figure 2:
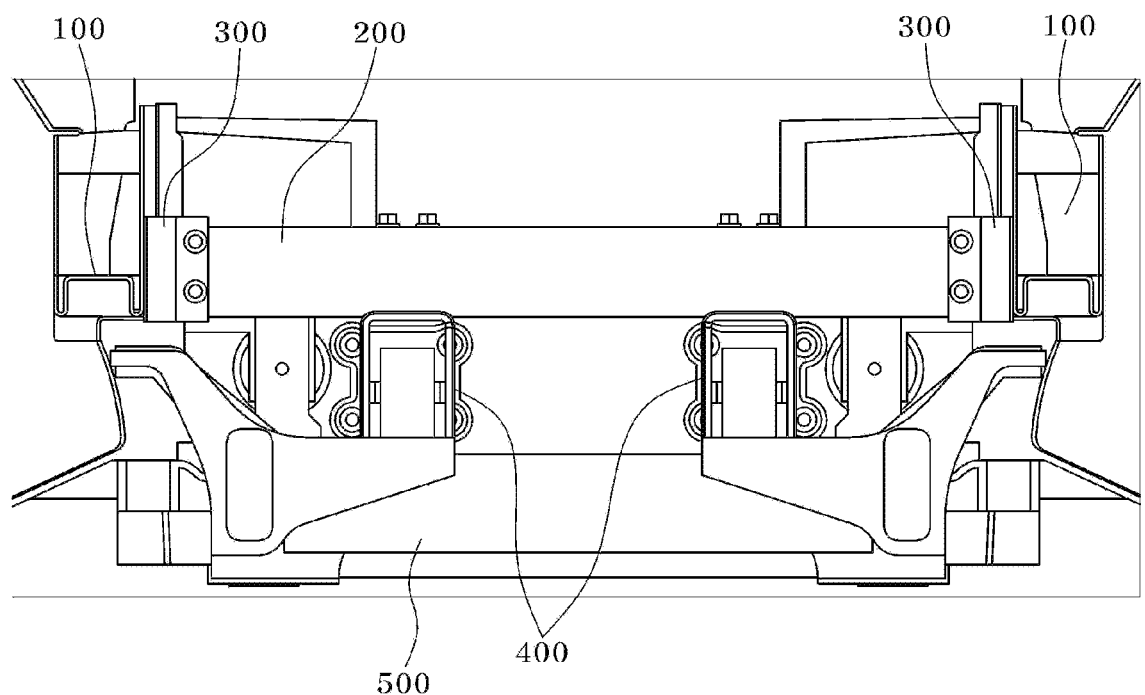
FIG. 2 is a front view illustrating the structure for reinforcing and supporting a vehicle frunk according to the embodiment of the present disclosure.

FIG. 2 is a front view illustrating the structure for reinforcing and supporting a vehicle frunk according to the embodiment of the present disclosure. Referring to FIG. 2, the motor mounts 400 according to the embodiment of the present disclosure may resist the load applied to the frunk bar 200 in the height direction of the vehicle.

When a load is applied to an existing frunk bar in a height direction, the rigidity of the frunk bar may not be secured since the motor mount and frunk bar coupled to a subframe are placed on different longitudinal lines. On the contrary, since the frunk bar 200, the motor mounts 400, and the subframe 500 are sequentially arranged in the straight line in the height direction of the vehicle in the present disclosure, it is possible to improve the support rigidity of the frunk bar 200.

Figure 3:
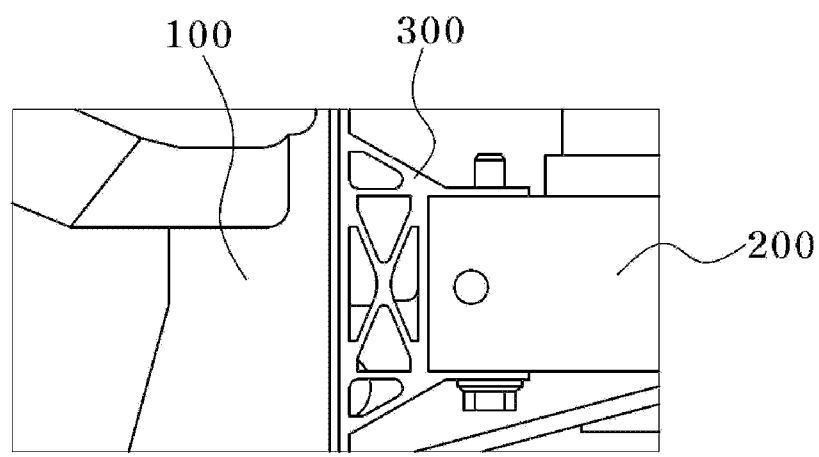
FIG. 3 is a cross-sectional view illustrating one bracket in the structure for reinforcing and supporting a vehicle frunk according to the embodiment of the present disclosure.

FIG. 3 is a cross-sectional view illustrating one bracket in the structure for reinforcing and supporting a vehicle frunk according to the embodiment of the present disclosure.

Referring to FIG. 3, in the structure for reinforcing and supporting a vehicle frunk according to the embodiment of the present disclosure, the bracket 300 may have a truss shape in cross-section.

If the bracket 300 is in the form of a simple flange coupling structure, the bracket 300 and the frunk bar 200 may be deformed due to deterioration in the resistance to the rotation thereof. For this reason, the bracket 300 of the present disclosure has the truss shape in cross-section when viewed from the top in the height direction.

The truss shape of the bracket 300 may be a triangular truss shape or a planar truss shape, and the bracket 300 may be assembled in at least one triangular form. The triangular members of the bracket 300 may be hinged in a node connecting manner to freely change an angle thereof. Thus, it is possible to resist rotational distortion since the hinges of the triangular members are rotated corresponding thereto.

Figure 4:
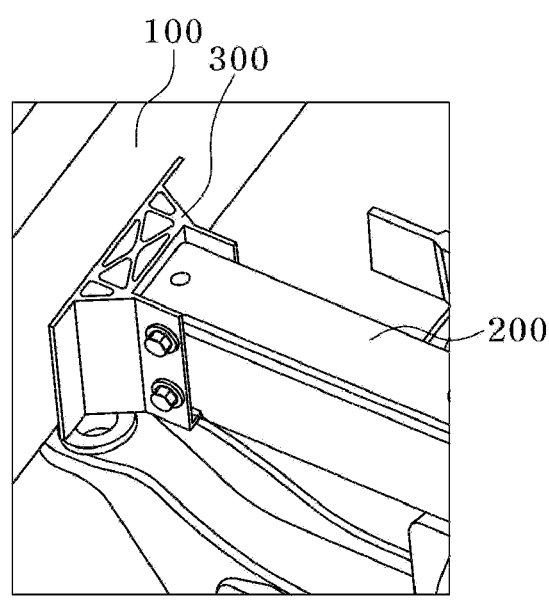
FIG. 4 is a view illustrating a bolting structure of the bracket in the structure for reinforcing and supporting a vehicle frunk according to the embodiment of the present disclosure.

FIG. 4 is a view illustrating a bolting structure of the bracket in the structure for reinforcing and supporting a vehicle frunk according to the embodiment of the present disclosure.

Referring to FIG. 4, the frunk bar 200 according to the embodiment of the present disclosure may be coupled to the front side members 100 by the brackets 300 having a bolting structure that passes therethrough in the longitudinal direction of the vehicle.

At least two bolting structures may be spaced apart from each other in each of the brackets 300. Thus, the bolting structures may improve the resistance to rotation compared to when passing through the bracket 300 in the height direction.

The frunk bar 200 may be coupled to each of the front side members 100 by the associated bolting structure that longitudinally passes through the associated bracket 300. Preferably, one end of the bracket 300 in the width direction of the bracket 300 may be coupled to the front side member 100 by welding and the other end of the bracket 300 may be formed with a hole for the bolting structure.

Correspondingly, the bolting structure may pass through the bracket 300 in the state in which one end of the frunk bar 200 coupled to the front side member 100 is inserted into the bracket 300.

Figure 5:
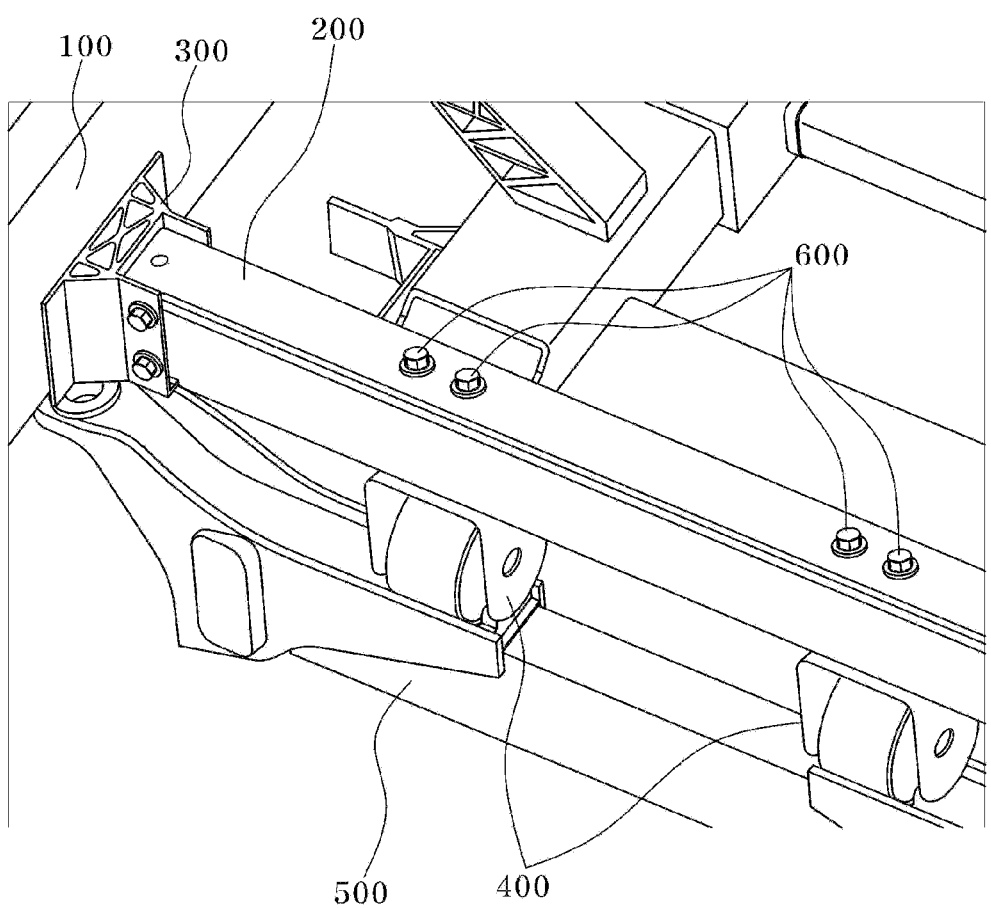
FIG. 5 is a view illustrating a through-pipe in the structure for reinforcing and supporting a vehicle frunk according to the embodiment of the present disclosure.

FIG. 5 is a view illustrating a through-pipe in the structure for reinforcing and supporting a vehicle frunk according to the embodiment of the present disclosure.

Referring to FIG. 5, at least one frunk bar through-pipe 600 may pass through the frunk bar 200 in the height direction of the frunk bar 200 at a position corresponding to each of the motor mounts 400. Preferably, two frunk bar through-pipes 600 may be spaced apart from each other at each of the motor mounts 400.

The frunk bar through-pipes 600 may improve the coupling rigidity between the frunk bar 200 and the motor mounts 400. Preferably, each of the frunk bar through-pipes 600 may pass through the upper surface of the associated motor mount 400 by vertically passing through the frunk bar 200. Thus, it is possible to improve the coupling rigidity between the frunk bar 200 and the motor mounts 400 and to generate an additional reaction force when a load is applied to the frunk space.

In summary, since the structure according to the present disclosure includes the frunk bar 200, the motor mounts 400, and the subframe 500, which are arranged on the same line in the height direction of the vehicle, it is possible to improve the resistance to the vertical load acting on the frunk and to enhance the resistance to the rotational distortion of the frunk bar by improving the shape of the bracket 300 and the direction of the bolting structure.

As is apparent from the above description, the present disclosure can obtain the following effects by the configuration, combination, and relationship of the components described in the exemplary embodiments.

Since the structure for reinforcing and supporting a vehicle frunk according to the present disclosure includes the frunk bar, the motor mounts, and the subframe, which are arranged on the same line in the height direction of the vehicle, it is possible to improve the resistance to the vertical load acting on the frunk.

In addition, since the structure couples and fixes the frunk bar to the front side members by the bolting structure that passes therethrough in the longitudinal direction of the vehicle, it is possible to improve the resistance to the rotational distortion of the frunk bar.

In addition, since the bracket configured to connect the frunk bar to a respective one of the front side members has a truss shape in cross-section, it is possible to improve the resistance to the rotational distortion of the frunk bar as a reinforcement member.

In addition, since the frunk bar induces the lateral behavior of the vehicle in the event of small overlap collision, it is possible to reduce the contact between the barrier and the vehicle.

The above detailed description is illustrative of the disclosure. In addition, the above description is intended to illustrate and explain the preferred embodiments of the present disclosure, and the present disclosure may be used in various other combinations, modifications, and environments. That is, it is possible to make changes or modifications within the scope of the concept of the disclosure disclosed herein, within the scope of the disclosure, and/or within the skill and knowledge of the art. The described embodiments are intended to illustrate the best mode for carrying out the technical idea of the present disclosure and various changes may be made in the specific applications and uses of the present disclosure. Accordingly, the detailed description of the disclosure is not intended to limit the disclosure to the disclosed embodiments. It is also to be understood that the appended claims are intended to cover such other embodiments.

What is claimed is:

1. A structure for reinforcing and supporting a vehicle frunk, comprising:
   front side members installed in a front-to-back direction of a vehicle body at both sides of a front floor panel of a vehicle;
   a frunk bar extending in a width direction of the vehicle between the front side members and connected to the front side members;
   a bracket formed at a position corresponding to connection between the frunk bar and each of the front side members, to couple the frunk bar to a respective one of the front side members;
   at least two motor mounts formed beneath the frunk bar in a height direction of the frunk bar; and
   a subframe positioned beneath the motor mounts in a height direction of the motor mounts and connected to the front side members to extend in the width direction of the vehicle.

2. The structure of claim 1, wherein the bracket has a truss shape in cross-section.

3. The structure of claim 1, wherein the frunk bar is coupled to the respective one of the front side members by the bracket having a bolting structure that passes through the respective one of the front side members in a longitudinal direction of the vehicle.

4. The structure of claim 1, wherein the motor mounts are configured to resist a load applied to the frunk bar in a height direction of the vehicle.

5. The structure of claim 1, further comprising at least one frunk bar through-pipe formed through the frunk bar in the height direction of the frunk bar at a position corresponding to each of the motor mounts.

6. The structure of claim 1, wherein the frunk bar, the motor mounts, and the subframe are positioned in a straight line in a height direction of the vehicle.

* * * * *